United States Patent [19]

Koch

[11] 4,081,937
[45] Apr. 4, 1978

[54] VEHICLE SUN-SHADE

[76] Inventor: Kevin Errol Koch, 14 Kinkaid Avenue, North Plympton, Australia, 5037

[21] Appl. No.: 727,334

[22] Filed: Sep. 28, 1976

[30] Foreign Application Priority Data

Sep. 29, 1975 Australia .............................. 3351/75

[51] Int. Cl.² ............................ E06B 7/08; E04B 5/52
[52] U.S. Cl. ...................................... 52/309.1; 52/473; 52/476; 52/507; 52/674; 296/97 A
[58] Field of Search ................... 52/473, 673, 674, 511, 52/506, 476, 107, 507, 309.1; 161/110; 98/121; 55/DIG. 30, DIG. 37, DIG. 41; 23/288 F; 296/97 A, 97 R

[56] References Cited

U.S. PATENT DOCUMENTS

| 2,757,040 | 7/1956 | McLelland | 296/97 R |
| 2,759,413 | 8/1956 | Smith | 52/473 |
| 2,807,062 | 9/1957 | Sikemma et al. | 52/473 |
| 3,221,636 | 12/1965 | Smith et al. | 52/473 |
| 3,818,667 | 6/1974 | Wagner | 52/473 |
| 3,868,803 | 3/1975 | Bice | 52/473 |
| 3,977,143 | 8/1976 | Nilsson | 52/473 |

FOREIGN PATENT DOCUMENTS

| 2,407,456 | 8/1975 | Germany | 296/97 A |
| 2,361,669 | 7/1974 | Germany | 296/97 R |
| 561,831 | 5/1975 | Switzerland | 52/107 |
| 1,179,748 | 1/1970 | United Kingdom | 296/97 R |

Primary Examiner—Alfred C. Perham
Assistant Examiner—Robert C. Farber
Attorney, Agent, or Firm—Lawrence E. Sklar

[57] ABSTRACT

A vehicle sun-shade of the louvre type formed from plastic wherein sagging due to high temperature imparted to the plastic is reduced by the use of a spacer rod passing through bushes in which it is frictionally engaged, the bushes being in the louvres and between their ends.

5 Claims, 3 Drawing Figures

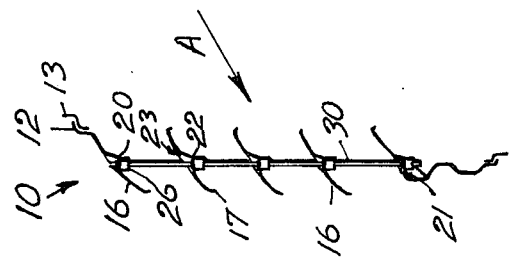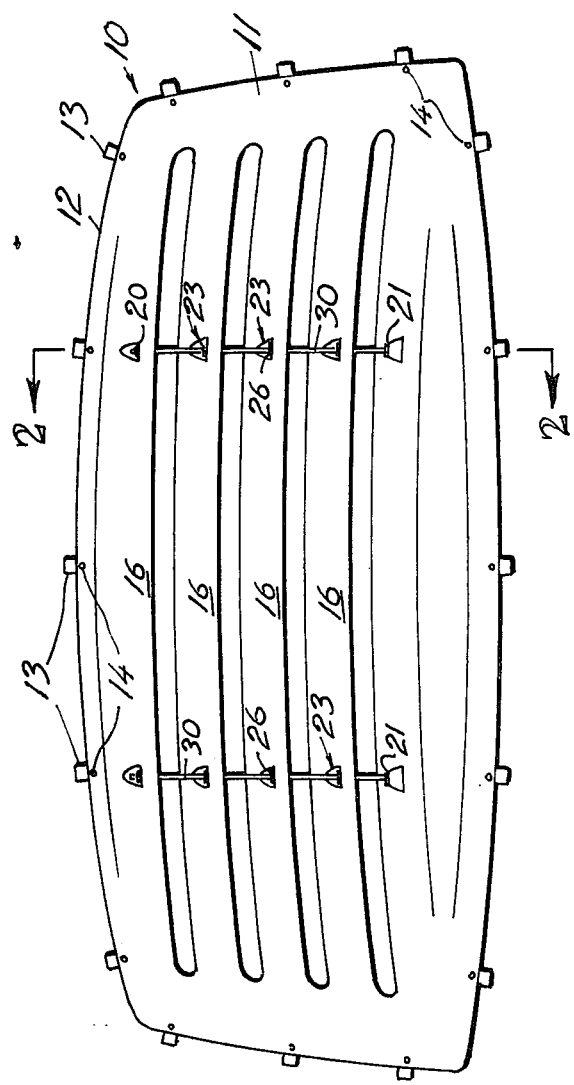

VEHICLE SUN-SHADE

This invention relates to a sun-shade of the louvre type which is attachable over the rear vision window of a motor vehicle.

BACKGROUND OF THE INVENTION

Louvre type sun-shades are well known, and louvre sun-shades have been produced (inter alia) by vacuum forming plastics material, then cutting out the "sight" areas to leave between those areas a series of parallel louvres which are normally horizontal so that driver can have a relatively uninterrupted rear vision through his rear window, yet the louvres overlap one another in a vertical plane to a degree sufficient to reduce the amount of sunlight which is likely to enter a motor vehicle.

The polymeric material which is utilised necessarily has a relatively large coefficient of expansion, and therefore it has been deemed necessary heretofore to retain the louvres intermediate their ends with steel brackets which are interconnected, the reinforcing member commonly being known in the trade as a "tree". The use of these trees has some effect in retaining the dimensional stability and shape of the louvres when the louvres are subjected to excessive heat in the sun, in that they reduce the sag of the louvres, but the trees are relatively rigid and immovable, and therefore local distortion of the louvres frequently takes place, and this local distortion is unsightly.

The main object of this invention is to provide improvements whereby the distortion may be at least partly reduced. A further object is to provide a vehicle sun-shade which will stack with other similar sun-shades to occupy a smaller space than heretofore, for packaging purposes.

BRIEF SUMMARY OF THE INVENTION

Briefly in this invention a vehicle sun-shade is of the type generally described above, but instead of utilising a metal "tree", use is made of a series of aligned bushes which engage the louvres intermediate their ends, the bushes themselves containing a spacer rod which extends through them so as to dimensionally retain the respective louvres of the sun-shade.

More specifically, the invention consists of a vehicle sun-shade of the louvre type which is attachable over the rear vision window of a motor vehicle, comprising a sheet of polymeric material having a surround, attachment means extending outwardly of the surround, and a plurality of louvres inclined to the general plane of the surround, a series of aligned apertures in respective said louvres between their ends, a plurality of bushes each engaging a respective said aperture, and a spacer rod also comprising polymeric material extending through said bushes and frictionally engaging each of the bushes with an interference fit.

If fibreglass reinforced plastics, or other material comprising or consisting of plastics material is utilised, it is found that the coefficient of expansion more nearly approaches that of the material of the louvres themselves than the coefficient of a metal rod, so that the louvres as a whole may expand under the influence of high temperature, along with the reinforcing rods, and in turn less local distortion takes place. If each bush utilised has a bore of such diameter that the rod is slidable therein, (even though there is considerable resistance against sliding) there is some degree of freedom of movement such as to both provide adjustment means and reduce distortion due to thermal expansion. If the bush is itself of thermoplastics material relative movement can sometimes take place since the grip of the bush on the rod will be reduced under high temperature conditions. The cost can be reduced to be less than that of a metal "tree", and the appearance considerably improved.

BRIEF DESCRIPTION OF THE DRAWINGS

In the drawings:

FIG. 1 is a rear elevation of a vehicle sun-shade,

FIG. 2 is a section through line 2—2 of FIG. 1, and

DETAILED DESCRIPTION OF THE PREFERRED EMBODIMENT

Figure 3:
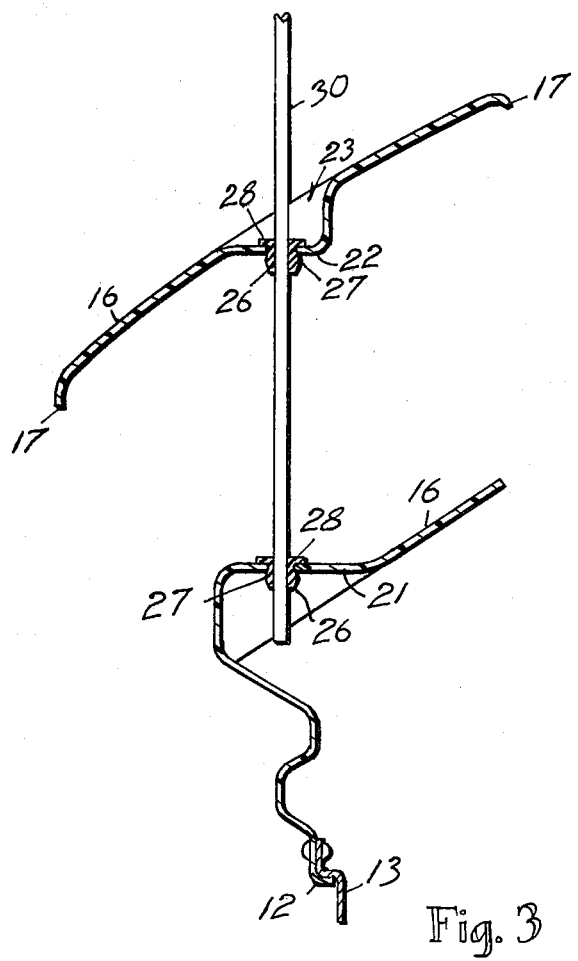
FIG. 3 is a fragmentary section, corresponding to the lower part of FIG. 2, but drawn to an enlarged scale.

In this embodiment a vehicle sun-shade 10 is provided with peripheral surround 11 of such shape and size as to be positioned with its outer edge 12 contiguous with the periphery of a motor vehicle window. Different windows of course are of different shapes and in each instance the peripheral frame surround is of such shape and size as to be contiguous with the securing rubbers of the vehicle window. For securing purposes, the frame surround has outstanding retaining clips 13 of metal secured thereto by rivets 14, this being in accordance with known art. Flat portions of the clips extend beyond the periphery of the surround 11 and are engageable between the glass and the rubber of a rear window.

The space defined by the frame surround 11 is itself divided into a series of spaced parallel louvres 16, the cross-sectional shape of each louvre including shallow edge flanges 17 which impart considerable stiffness to the louvre such as to reduce the tendency to sag. This shape is achieved by a vacuum forming process and subsequently removal of the material to provide the required sight areas. The arrow A in FIG. 2, indicates the sight direction of minimum interference by the louvres, and is so inclined that, when the sun-shade is fitted to a vehicle window, the direction of minimum interference is nearly horizontal, but still sloping downwardly by a small amount which corresponds as closely as possible to the normal inclination of a rear vision mirror of a motor vehicle.

At the top and also at the bottom the peripheral frame surround is formed to have parallel lands respectively designated 20 and 21, and intermediate these lands the louvres 16 also are provided with parallel lands 22, there being formed in some of the instances at least by means of recesses 23 the lower portions of which are parallel to one another.

Each land contains an aperture the walls of which retain a respective bush 26, each bush 26 being a circular member formed of nylon or other thermoplastics material and having a circular rib 27 intermediate its ends outstanding radially from the walls, and having its upper end provided with a flange 28, the arrangement being such that between the rib and the flange there is a reduced diameter portion. With this arrangement the nylon bushes may be "snapped" into the apertures in the respective lands, the apertures being aligned in a plurality of locations, in this embodiment there being two.

A fibreglass reinforced plastic rod 30 is then passed through the aligned bushes 26 and is of such dimension as to be frictionally gripped by the bushes with such interference that longitudinal movement of the rod (with respect to its own axis) is restrained but not prevented. This avoids the deleterious "locking up" effect of the otherwise used metal "trees" and allows some expansion to take place of the louvres with less buckling than has occurred heretofore, and it greatly simplifies adjustment.

It will be appreciated that there are many side advantages to the use of this invention. The louvres may be readily adjusted by a driver on a hot day so that the distortion is maintained at a minimum. When the rod extends through the louvres only at intermediate points across their faces, and then only through deformed parts, local distortion of the louvre faces is limited because of the inherent rigidity of the deformed areas, and that distortion which does occur is likely to be limited to the land areas. The cost is less than the cost of a metal tree, and the components used do not present corrosion problems. Furthermore, the louvres are stackable one upon another to a much greater extent than heretofore.

What is claimed is:

1. A vehicle sun-shade of the louvre type which is attachable over the rear vision window of a motor vehicle, comprising:
   a sheet of polymeric material having a surround, attachment means extending outwardly of the surround, and a plurality of louvres inclined to the general plane of the surround;
   a series of aligned apertures in respective said louvres between their ends;
   a plurality of bushes each engaging a respective said aperture, said bushes being of polymeric material; and
   a spacer rod also comprising polymeric material extending through said bushes and frictionally engaging each of the bushes with an interference fit, the alignment of apertures being in such direction that the spacer rod extends substantially at right angles to the general direction of the louvres.

2. A vehicle sun-shade according to claim 1 wherein each louvre has a land containing a said aperture, the land being (a) in a deformed portion of the louvre, (b) parallel to lands in other louvres, and (c) at right angles to said rod.

3. A vehicle sun-shade according to claim 2 wherein said surround has further lands each containing an aperture aligned with said louvre apertures, each said further land also being at right angles to said rod, and a further bush in each respective surround aperture, said rod also frictionally engaging said further bushes with an interference fit.

4. A vehicle sun-shade according to claim 1 including a plurality of said series of aligned apertures each containing a respective said bush, and a corresponding series of spacer rods of polymeric material, each extending through the bushes of a respective said series of apertures and frictionally engaging those bushes with an interference fit.

5. A vehicle sun-shade according to claim 1 wherein the edge of each louvre comprises a shallow stiffening flange.

* * * * *